United States Patent [19]

Cantrell et al.

[11] 4,139,332
[45] Feb. 13, 1979

[54] PUMPING RATE CONTROL METHOD AND APPARATUS FOR INTERNAL COMBUSTION ENGINE DRIVEN PUMPS

[76] Inventors: Steven M. Cantrell, 2216 E. 18th St., Ada, Okla. 74820; Sydney J. Keasler, 16214 Sinapore, Houston, Tex. 77040

[21] Appl. No.: 780,036

[22] Filed: Mar. 22, 1977

[51] Int. Cl.² .............................................. F04B 49/00
[52] U.S. Cl. ......................................... 417/34; 417/38; 417/46
[58] Field of Search ..................... 417/34, 36, 46, 38

[56] References Cited

U.S. PATENT DOCUMENTS

| 624,779 | 5/1899 | Ford | 417/36 X |
|---|---|---|---|
| 862,867 | 8/1907 | Eggleston | 417/390 |
| 2,314,421 | 3/1943 | Peterson | 417/36 X |
| 2,634,681 | 4/1953 | Rowell | 417/34 |
| 2,956,581 | 10/1960 | Pearson | 417/36 X |
| 3,101,670 | 8/1963 | Olson | 417/34 |
| 3,103,891 | 9/1963 | Fulton et al. | 417/34 X |
| 3,431,858 | 3/1969 | Lynn et al. | 417/36 X |
| 3,676,017 | 7/1972 | Castleberry | 417/34 |
| 3,937,596 | 2/1976 | Braidwood | 417/36 |

*Primary Examiner*—Carlton R. Croyle
*Assistant Examiner*—Edward Look
*Attorney, Agent, or Firm*—Laney, Dougherty, Hessin & Beavers

[57] ABSTRACT

A method and apparatus for controlling the liquid pumping rate of an internal combustion engine driven pump taking suction from a surge tank whereby a substantially constant level of liquid is maintained within the surge tank. The vacuum produced by the internal combustion engine is utilized to change the speed of the engine and the vacuum level is varied in proportion to changes in the level of liquid in the surge tank.

5 Claims, 2 Drawing Figures

PUMPING RATE CONTROL METHOD AND APPARATUS FOR INTERNAL COMBUSTION ENGINE DRIVEN PUMPS

BACKGROUND OF THE INVENTION

1. Field of the Invention

The present invention relates to a method and apparatus for controlling the pumping rate of internal combustion engine driven pumps, and more particularly, but not by way of limitation, to a method and apparatus for controlling the liquid pumping rate of an internal combustion engine driven pump taking suction from a surge tank whereby a substantially constant level of liquid is maintained therein.

2. Description of the Prior Art

In many industrial applications, and particularly in oil fields, internal combustion engine driven pumps are utilized for pumping liquid from one or more surge tanks to points of use. For example, in water flood and other secondary oil and gas recovery operations, water or other similar liquid is pumped into a subterranean formation by way of one or more injection wells to drive the desired fluids contained in the formation to production wells. In water flood operations, water produced by way of the production wells is separated from the recovered fluids and recycled to one or more surge tanks from where the water is again pumped into the injection wells. In remote locations where natural gas is readily available or more economical than electricity, internal combustion engines are utilized to drive the pump or pumps taking suction from the surge tanks. Since the rate of liquid pumped must vary with the supply of liquid available, it is necessary that such rate be controlled so that a substantially constant level of liquid is maintained in the surge tank or tanks.

While a great variety of level control and other control apparatus has been developed and used, most of such control apparatus heretofore utilized for controlling the liquid pumping rate of an internal combustion engine driven pump has been elaborate, expensive and subject to upsets and/or failures.

By the present invention, a method of controlling the liquid pumping rate of an internal combustion engine driven pump taking suction from a surge tank and apparatus for carrying out the method are provided which are simple, economical and extremely reliable.

SUMMARY OF THE INVENTION

By the present invention a method of controlling the liquid pumping rate of an internal combustion engine driven pump taking suction from a surge tank whereby a substantially constant level of liquid is maintained within the surge tank is provided. The method comprises sensing changes in the level of liquid in the surge tank, producing a vacuum from the manifold of the internal combustion engine which varies in proportion to the sensed changes in the level of liquid in the surge tank and changing the speed of the internal combustion engine and the liquid pumping rate of the pump in proportion to changes in the vacuum. Apparatus for carrying out the method is also provided.

It is, therefore, a general object of the present invention to provide a pumping rate control method and apparatus for internal combustion engine driven pumps.

A further object of the present invention is the provision of a method of controlling the liquid pumping rate of an internal combustion engine driven pump taking suction from a surge tank which utilizes the vacuum produced by the internal combustion engine as a control medium to control the speed of the engine and rate of liquid pumped in proportion to changes in the level of liquid in the surge tank.

A further object of the present invention is the provision of simple, economical and reliable apparatus for controlling the liquid pumping rate of an internal combustion engine driven pump taking suction from a surge tank whereby a substantially constant level of liquid is maintained within the surge tank.

Other objects and advantages of the invention will be apparent to those skilled in the art upon a reading of the description of preferred embodiments which follows when taken in conjunction with the accompanying drawings.

DESCRIPTION OF PREFERRED EMBODIMENTS

Figure 1:
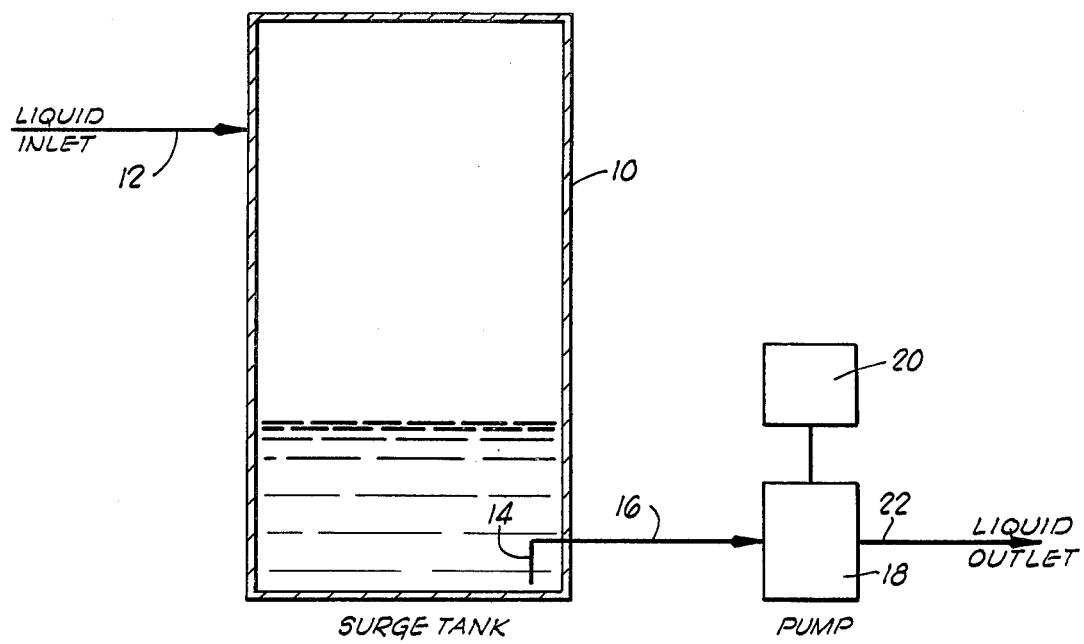
FIG. 1 is a schematic view of a combustion engine driven pump taking suction from a surge tank.

Referring now to the drawings, and particularly to FIG. 1, a typical surge tank-internal combustion engine driven pump arrangement is illustrated. A surge tank 10 is provided which can be one or a plurality of individual tanks into which a liquid stream is conducted by way of a conduit 12 connected thereto. At a position near the bottom of the surge tank 10, a liquid draw-off pipe 14 is provided connected to a conduit 16. The conduit 16 leads a stream of liquid from the surge tank 10 to the suction connection of a pump 18 which is driven by an internal combustion engine 20. A conduit 22 is connected to the discharge of the pump 18 which leads the stream of liquid to a point of use.

As stated above, the system of apparatus illustrated in FIG. 1 is typical of the apparatus utilized for carrying out water flood operations in oil fields, and because such apparatus is often located in remote areas, internal combustion engines which utilize natural gas or gasoline as fuel are utilized to drive the pump or pumps used. Further, because the pump or pumps must produce a relatively high flow rate of water at a high pressure level, positive displacement pumps rather than centrifugal pumps are commonly used. This combination of gas engine driven positive displacement pump taking suction from a surge tank where the in-flow of liquid to the surge tank is erratic presents a particularly severe control problem. That is, the speed of the internal combustion engine and the resultant flow rate of liquid pumped must be constantly varied in order to prevent the surge tank from running dry and causing damage to the pump or overflowing.

Heretofore, various control methods and apparatus have been developed and used for controlling the flow rate of liquid pumped in the application described above. However, such methods and apparatus have been elaborate, expensive and generally subject to upset or failure. By the present invention, a simple method and apparatus for controlling the speed of the internal combustion engine 20, and consequently, the flow rate of liquid pumped by the pump 18 are provided whereby a substantially constant level of liquid is maintained in the surge tank 10 even though the flow rate of liquid entering the surge tank 10 by way of the conduit 12 is erratic.

By the method of the present invention, the vacuum produced in the manifold of the internal combustion engine 20 is utilized as the control medium for controlling the speed of the engine in accordance with changes in the level of liquid in the surge tank 10. This method is particularly advantageous in that failures associated with electrically operated controls or controls which operate utilizing air or gas under a positive pressure are eliminated. Electrically operated controls are subject to failure due to power outages and are generally elaborate making their operation and maintenance difficult and expensive. Pneumatic or gas operated controls which utilize air or gas under a positive pressure from an outside source are subject to failure when the source of air or gas fails.

Figure 2:
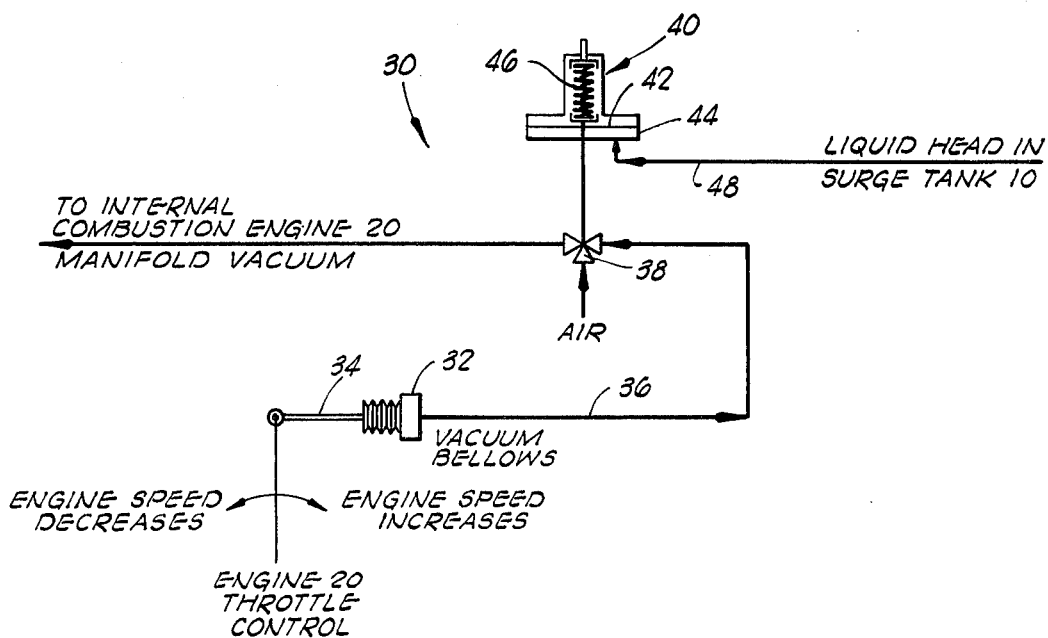
FIG. 2 is a schematic illustration of the apparatus of the present invention for controlling the liquid pumping rate of the internal combustion engine driven pump of FIG. 1.

Referring to FIG. 2, the apparatus for carrying out the method of the present invention is illustrated and generally designated by the numeral 30. The apparatus 30 basically comprises a vacuum responsive means, i.e., a bellows 32, which converts changes in the level of vacuum communicated therewith to mechanical movement. That is, the bellows 32 includes an arm 34 attached to the movable end thereof which is in turn connected to the mechanical speed control or throttle of the internal combustion engine 20. The internal portion of the bellows 32 is sealingly connected to a conduit 36. The conduit 36 is in turn connected directly to the manifold of the internal combustion engine 20 so that the vacuum produced therein is communicated with and exerted on the internal portions of the bellows 32. As will be understood, in the arrangement illustrated in FIG. 2, increases in vacuum exerted on the bellows 32 move the arm 34 attached thereto and the throttle control of the engine 20 in a direction which increases the speed of the engine, while decreases in the vacuum exerted on the bellows 32 move the arm 34 and throttle control of the engine 20 in a direction which decreases the speed of the engine 20.

Disposed within the conduit 36 is a three-way control valve 38 which is of a conventional type such as a Fisher Controls Type 122A or Type 164A three-way switching valve as shown in Fisher Controls Bulletin 71.7:122A (April, 1974) or Bulletin 71.7:164A (May, 1971). Two of the ports of the control valve 38 are connected to the conduit 36 with the third port open to the atmosphere. The inner valve and port arrangement of the three-way valve 38 is such that when the valve 38 is fully opened, the ports connected to the conduit 36 are open and the port communicated with the atmosphere is closed whereby the entire manifold vacuum of the engine 20 is communicated to the vacuum bellows 32. When the valve 38 is fully closed, the port thereof connected to the portion of the conduit 36 between the bellows 32 and the valve 38 is communicated with the port exposed to the atmosphere, and the port connected to the manifold of the engine 20 is closed. As the valve 38 is moved to different positions between open and closed, the vacuum communicated to the bellows 32 is varied.

The inner valve of the three-way valve 38 is mechanically connected to a liquid level control apparatus generally designated by the numeral 40. The liquid level control 40 can be any of a variety of conventional liquid level control assemblies, but preferably is a self-contained diaphragm operated assembly which does not require an outside source of electricity or pressurized gas for effecting its operation. Preferably, the liquid level control 40 includes a diaphragm 42 sealingly disposed within a housing 44. A spring or other biasing means 46 is disposed on one side of the diaphragm 44 for exerting a constant pressure on the diaphragm 44. A conduit 48 is sealingly connected between the bottom portion of the surge tank 10 and the housing 44 of the liquid level control 40 so that fluid pressure from the surge tank 10 is communicated to the diaphragm 44 on the opposite side thereof from the spring 46. That is, the fluid pressure communicated to the liquid level control apparatus 40 by way of the conduit 48 is the head of liquid in the surge tank 10 above the point of connection of the conduit 48 thereto. In operation of the liquid level control apparatus 40, the pressure exerted on one side of the diaphragm 44 by the head of liquid in the surge tank 10 when the desired liquid level exists therein is balanced by adjusting the spring tension exerted on the other side of the diaphragm 44. Thereafter, when the liquid level in the surge tank increases, the diaphragm moves upwardly which in turn opens the valve 38, i.e., increases the vacuum exerted on the bellows 32. When the liquid level in the surge tank 10 decreases, the head exerted on the diaphragm 44 also decreases which closes the valve 38, i.e., decreases the vacuum exerted on the bellows 32.

As will now be apparent, in operation of the apparatus 30, the internal combustion engine 20 is started which produces a vacuum in the manifold thereof, which vacuum is communicated to the bellows 32. Once the desired liquid level is reached in the surge tank 10, the liquid level control apparatus 40 is balanced so that if the level increases, the level of vacuum exerted on the bellows 32 increases, which in turn increases the speed of the internal combustion engine 20. The increase in speed of the engine 20 increases the flow rate of liquid pumped by the pump 18 thereby lowering the level of liquid in the surge tank 10. When the liquid level in the surge tank 10 decreases, the liquid level control apparatus 40 moves the valve 38 towards the closed position which causes the vacuum exerted on the bellows 32 to decrease which in turn decreases the speed of the engine 20.

Changes in the level of vacuum existing in the manifold of the engine 20 contribute to the operation of the control apparatus 30 in that when the speed of the engine 20 is decreased by the apparatus 30, the level of vacuum existing in the manifold of the engine 20 is also decreased, and vice versa, which facilitates the maintenance of a substantially constant liquid level in the surge tank 10.

Thus, the present invention is well adapted to carry out the objects and attain the ends and advantages mentioned as well as those inherent therein. Because the vacuum created in the manifold of the internal combustion engine is utilized as the control medium in accordance with the present invention, no outside source of electricity or pressurized gas is required obviating problems associated therewith. While numerous changes in the arrangement of parts and steps of the present invention can be made by those skilled in the art, such changes are encompassed within the spirit of this invention as defined by the appended claims.

What is claimed is:

1. A method of controlling the liquid pumping rate of an internal combustion engine driven pump taking suction from a surge tank whereby a substantially constant level of liquid is maintained within said surge tank comprising the steps of:

sensing changes in the level of liquid in said surge tank;

producing a vacuum from the manifold of said internal combustion engine which varies in proportion to said sensed changes in the level of liquid in said surge tank; and changing the speed of said internal combustion engine and the liquid pumping rate of said pump in proportion to changes in the level of said vacuum.

2. The method of claim 1 wherein the speed of said engine is varied in direct proportion to variations in said vacuum and said vacuum is varied in direct proportion to changes in said level of liquid in said surge tank.

3. The method of claim 2 wherein said liquid is water and said pump is a positive displacement pump.

4. Apparatus for controlling the liquid pumping rate of an internal combustion engine driven pump taking suction from a surge tank whereby a substantially constant level of liquid is maintained within said surge tank comprising:

vacuum responsive means connected to the throttle of said internal combustion engine;

a conduit connecting said vacuum responsive means to the manifold of said engine whereby the vacuum created in said manifold is operably connected to said vacuum responsive means;

valve means disposed in said conduit for varying the level of vacuum communicated to said vacuum responsive means; and liquid level control means for sensing changes in the level of liquid in said surge tank connected thereto and operably connected to said valve means whereby said valve means varies the level of vacuum communicated to said vacuum responsive means in proportion to changes in the level of liquid in said surge tank.

5. The apparatus of claim 4 wherein said vacuum responsive means is a vacuum operated bellows mechanically connected to said throttle.

* * * * *